(12) United States Patent
Garg et al.

(10) Patent No.: US 11,775,962 B2
(45) Date of Patent: Oct. 3, 2023

(54) METHOD AND SYSTEM FOR IMPROVED BLOCKCHAIN PERFORMANCE THROUGH AGGREGATION

(71) Applicant: MASTERCARD INTERNATIONAL INCORPORATED, Purchase, NY (US)

(72) Inventors: Chandan Garg, Punjab (IN); Jaipal Singh Kumawat, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 586 days.

(21) Appl. No.: 16/381,134

(22) Filed: Apr. 11, 2019

(65) Prior Publication Data
US 2020/0327537 A1    Oct. 15, 2020

(51) Int. Cl.
*G06Q 20/36*    (2012.01)
*H04L 9/08*    (2006.01)
*H04L 9/06*    (2006.01)

(52) U.S. Cl.
CPC ..... *G06Q 20/3672* (2013.01); *G06Q 20/3676* (2013.01); *H04L 9/0637* (2013.01); *H04L 9/0825* (2013.01); *H04L 9/0866* (2013.01)

(58) Field of Classification Search
CPC .................. G06Q 20/00–425; H04L 9/00–50
See application file for complete search history.

(56) References Cited

U.S. PATENT DOCUMENTS

| | | | |
|---|---|---|---|
| 2017/0091726 A1* | 3/2017 | Morgan | G06Q 20/065 |
| 2018/0276666 A1* | 9/2018 | Haldenby | G06Q 20/10 |
| 2020/0007317 A1* | 1/2020 | Thompson | H04L 9/0637 |

FOREIGN PATENT DOCUMENTS

CN    109360101 A  *  2/2019

OTHER PUBLICATIONS

Andreas M. Antonopoulos, "Mastering Bitcoin," O'Reilly Media, Inc. (Dec. 2014) ("Antonopoulos") (Year: 2014).*
Machine translation of CN109360101A, performed by Espacenet (Retrieved Sep. 25, 2021) (Year: 2019).*

* cited by examiner

*Primary Examiner* — Mohammad A. Nilforoush
(74) *Attorney, Agent, or Firm* — PANITCH SCHWARZE BELISARIO & NADEL LLP

(57) ABSTRACT

A method for periodic aggregation of blockchain transactions for reduced processing times and bandwidths includes: storing at least a cryptographic key pair comprising a private key and a public key and a plurality of unspent blockchain transactions, each unspent blockchain transaction including at least an output address and transaction amount; generating a digital signature using the private key; generating a recipient address using the public key; generating a new blockchain transaction after satisfaction of a trigger condition, the new blockchain transaction including each of the plurality of unspent blockchain transactions as inputs, the digital signature, the recipient address, and a transfer amount based on a summation of the transaction amount for each of the unspent blockchain transactions; and transmitting the new blockchain transaction to a node in a blockchain network.

20 Claims, 5 Drawing Sheets

METHOD AND SYSTEM FOR IMPROVED BLOCKCHAIN PERFORMANCE THROUGH AGGREGATION

FIELD

The present disclosure relates to the improving the performance of a blockchain through aggregation, specifically the aggregating of unspent transactions at predetermined intervals to reduce processing times and bandwidth necessary for blockchain operations.

BACKGROUND

Blockchains are useful in a variety of industries and contexts to store data for a number of reasons. One of the reasons is that blockchains are immutable: due to the architecture of the blockchain itself and how it is created and updated, it becomes computationally excessive and practically impossible to modify any portion of the blockchain over time. One such context where this can be exceedingly useful is cryptographic currencies, where a blockchain is used as a distributed ledger of transactions for a cryptographic currency. The immutability of such a blockchain ensures that every transaction is accurate and no party can lie or misrepresent the amount of currency to which they have access.

However, in order to preserve immutability and ensure that every possible new transaction can be properly confirmed and processed, a copy of the entire blockchain must always be available to every node in a blockchain network. Furthermore, each time a transaction is processed, the node must go back through the history of the blockchain for each unspent transaction for confirmation thereof. As a result, a node must maintain an ever-increasing data file for the blockchain, as well as performed processing on a larger data file and consider a larger amount of data as the blockchain is used. Thus, the processing times and bandwidths required to use a blockchain continue to increase over time, and can eventually be unsuitable for use.

As a result, there is a need for a technological solution to improve the processing speeds and times for blockchain transactions, and reducing the bandwidth required for blockchain interactions, without sacrificing the beneficial immutability of the data structure.

SUMMARY

The present disclosure provides a description of systems and methods for periodic aggregation of blockchain transactions to reduce processing times and bandwidths. As each transaction is conducted by an electronic wallet in a blockchain network, the wallet maintains a record of all unspent transactions for which it controls associated cryptographic currency. At a periodic interval, which could be based on time, number of unspent transactions, instructions from nodes, or other suitable criteria, the wallet may generate a new transaction that will serve as an aggregation of all unspent transactions for the wallet, by having all currency associated therewith transferred to a single new address controlled by the wallet. This transaction is processed, enabling the wallet to have only a single unspent transaction necessary for any future transactions. The nodes in the blockchain wallet can then disregard any block prior to the most recent block for that wallet. As wallets in a blockchain continue to perform aggregation, past blocks can eventually be archived as unspent transactions will be kept to only recent transactions for which aggregation has not yet been performed. The result is significantly faster processing for blockchain transactions, less data being transmitted for any new transactions, which reduces bandwidth, and a smaller barrier to entry for any new potential nodes in the blockchain network.

A method for periodic aggregation of blockchain transactions for reduced processing times and bandwidths includes: storing, in a memory of a computing device, at least a cryptographic key pair comprising a private key and a public key and a plurality of unspent blockchain transactions, each unspent blockchain transaction including at least an output address and transaction amount; generating, by a processing device of the computing device, a digital signature using the private key; generating, by the processing device of the computing device, a recipient address using the public key; generating, by the processing device, a new blockchain transaction after satisfaction of a trigger condition, the new blockchain transaction including each of the plurality of unspent blockchain transactions as inputs, the digital signature, the recipient address, and a transfer amount based on a summation of the transaction amount for each of the unspent blockchain transactions; and transmitting, by a transmitter of the processing device, the new blockchain transaction to a node in a blockchain network.

A system for periodic aggregation of blockchain transactions for reduced processing times and bandwidths includes: a memory of a computing device configured to store at least a cryptographic key pair comprising a private key and a public key and a plurality of unspent blockchain transactions, each unspent blockchain transaction including at least an output address and transaction amount; a processing device of the computing device configured to generate a digital signature using the private key, generate a recipient address using the public key, and generate a new blockchain transaction after satisfaction of a trigger condition, the new blockchain transaction including each of the plurality of unspent blockchain transactions as inputs, the digital signature, the recipient address, and a transfer amount based on a summation of the transaction amount for each of the unspent blockchain transactions; and a transmitter of the processing device configured to transmit the new blockchain transaction to a node in a blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Periodic Aggregation of Blockchain Transactions

Figure 1:
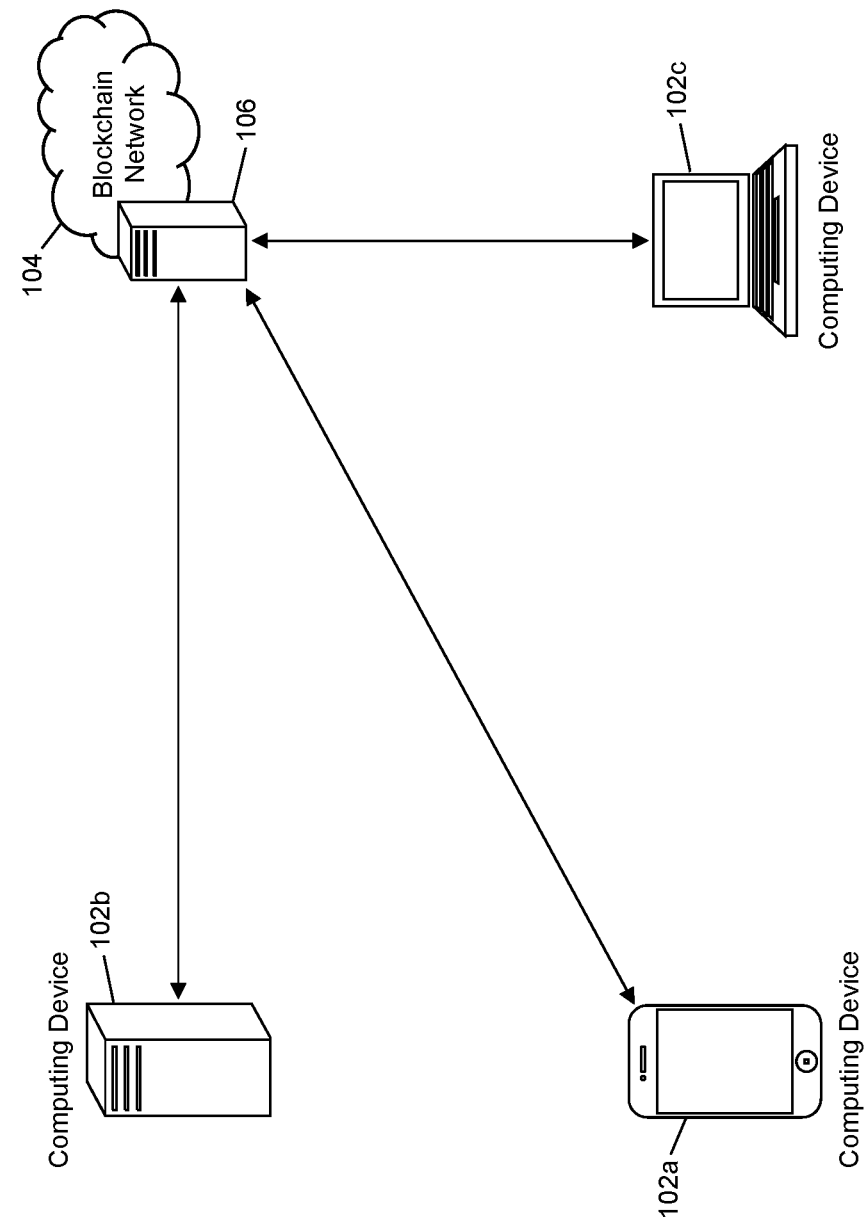
FIG. 1 is a block diagram illustrating a high level system architecture for aggregating blockchain transactions in accordance with exemplary embodiments.

FIG. 1 illustrates a system 100 for the periodic aggregation of transactions in a blockchain to increase processing speeds, decreasing processing times, and reduce bandwidth necessary for confirming new transactions and onboarding new nodes.

The system 100 may include a computing device 102. The computing device 102, discussed in more detail below, may be configured as a blockchain wallet and may be further configured to perform periodic aggregation of blockchain transactions associated with the wallet. As illustrated in FIG. 1, multiple types of computing devices 102, illustrated as computing devices 102a, 102b, and 102c, may each be configured to perform periodic aggregation as part of participation in a blockchain network 104. The computing device 102 may be any suitable type of device that has been specifically configured to perform the functions discussed herein. For example, a computing device 102 may be a specially configured desktop computer, laptop computer, notebook computer, tablet computer, cellular phone, smart phone, smart watch, smart television, wearable computing device, etc.

The blockchain network 104 may be comprised of a plurality of nodes 106. Each node 106 may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node 106 in the blockchain network 104 prior to the generation and addition of a new block to the blockchain in order for the change to be made permanent. Computational and communication limitations may make such a modification exceedingly difficult, if not impossible, thus rendering the blockchain immutable.

The blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to the computing device 102 that stores the private key for use thereof in blockchain transactions. For instance, each computing device 102a, 102b, and 102c may each have their own private key for respective cryptographic key pairs, and may each be a blockchain wallet for use in transactions with the blockchain associated with the blockchain network 104.

Each blockchain data value stored in the blockchain may correspond to a blockchain transaction. A blockchain transaction may consist of at least: a digital signature of the sender of currency that is generated using the sender's private key, a blockchain address of the recipient of currency generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the processing of a blockchain transaction, such data may be provided to a node 106 in the blockchain network 104, either by the sender or the recipient. The node 106 may verify the digital signature using the public key in the cryptographic key pair of the sender's wallet and also verify the sender's access to the funds (e.g., that the unspent transactions have not yet been spent and were sent to address associated with the sender's wallet), and then include the blockchain transaction in a new block. The new block may be validated by other nodes 106 in the blockchain network 104 before being added to the blockchain and distributed to all of the nodes 106 in the blockchain network 104.

In traditional blockchains, each computing device 102 may participate in blockchain transactions that will be confirmed by nodes 106 and added to the blockchain accordingly. Over time, cryptographic currency may be transmitted to blockchain wallets that may go unused as transaction outputs for a significant period of time. When these unspent transactions are finally used to transfer currency in a new transaction, the node 106 confirming the transaction will have to go back to the block containing the unspent transaction, verify the details, and then verify that the output has not been used as an input of a future transaction in any of the blocks added since the unspent transaction occurred. The longer time that has passed since the unspent transaction occurred, the longer time that is necessary for processing as more and more blocks and transactions must be checked by the node 106. Likewise, each of the blocks going back to the oldest unspent transaction must be maintained by each node 106 for use in confirmations. As a result, the amount of memory each node 106 must use and amount of processing necessary to confirm transactions constantly increases in a traditional blockchain. In addition, any new node 106 that wants to participate in the blockchain must copy at least all of the blocks going back to the earliest unspent transaction, making onboarding require more memory and bandwidth as time goes on.

In the system 100, each computing device 102 may be configured to perform periodic aggregation of the unspent transactions associated with the respective blockchain wallet. Periodic aggregation may be initiated as a result of a trigger condition. In some cases a trigger condition may be specific to each blockchain wallet. For instance, a trigger condition may be a predetermined number of unspent transactions (e.g., aggregation may be performed when a wallet has ten or more unspent transactions), an amount of unspent cryptographic currency available to the blockchain wallet (e.g., when the wallet has at least five units of currency available thereto), or when a predetermined period of time has passed since that wallet's last aggregation (e.g., aggregation on a monthly basis). In other instances, trigger conditions may be device agnostic, such as where every blockchain wallet must perform aggregation periodically (e.g., once a month all computing devices 102 perform aggregation. In an example, a rolling period may be used, such as where 1/30 of the blockchain wallets in the blockchain may perform aggregation each day during a 30 day period, which resets when the period has completed. In such an example, no unspent transactions will exist on the blockchain that are older than 30 days chronologically. In some cases, multiple trigger conditions may be used. For instance, each blockchain wallet may be configured to aggregate when ten unspent transactions have been reached, or 30 days have passed, whichever occurs first.

When a trigger condition occurs, the computing device 102 may perform aggregation. Aggregation may be accomplished by the computing device 102 identifying all unspent transactions for the blockchain wallet and then submitting a new transaction to a node 106 in the blockchain network 104 to spend all of the unspent transactions to transact the associated cryptographic currency from each to a single new address associated with the blockchain wallet. Such a submission to a node 106 in the blockchain network 104 may accordingly include at least a digital signature generated by the private key of the blockchain wallet, all of the unspent transaction outputs, a recipient address generated using the public key of the blockchain wallet, and the total cryptographic currency amount of the unspent transactions. A node 106 may receive the submission, validate the digital signature and confirm the unspent transactions, and then process the new blockchain transaction by adding it into a new block that is generated and confirmed by other nodes 106 in the blockchain network 104. The new block may be then added to the blockchain, where the blockchain wallet for the computing device 102 may then only have a single unspent transaction that has been newly added.

For example, the blockchain wallet for the computing device 102 may receive cryptographic currency at five different addresses as a result of previous transactions: a receipt of 1 unit at address 16W1TDMFA14YiaVoAGc5E8289FrAcM38Me, a receipt of 2 units each at addresses 1DrTs1QyrVVfrkfpEgDvZTgMEg6NoBpYvL and 19TmnTkbRt3NdNcSftgWKMp592SrBZZELU, a receipt of 5 units at address 1KTDDf4UTFt3x2NpVt46LusaYqDugP6JTj, and a receipt of 10 units at address 1pXovJWurvgrmqBAK3YnQqzVDMHiPfSwr. Each of these address may be unspent transaction outputs that are used as the input for the aggregation transaction, where the associated 20 units of cryptographic currency (e.g., less any fees, if applicable) are sent to a new address also associated with the blockchain wallet of the computing device 102: 1CxbRWSW6ttDVprhKXcpVRG7KTvpPfo8p7. This new address becomes the only unspent transaction output for the computing device 102, which it can then use in future transactions for up to the 20 units of cryptographic currency.

As each blockchain wallet performs aggregation, the number of unspent transactions in the blockchain is reduced and the oldest unspent transaction becomes younger (e.g., does not go back as many blocks from the most recent block). The result is that any new transaction requires less confirmations, as the number of unspent transactions will be reduced; less bandwidth is required for the new transaction, due to less transaction inputs being included in the submission; the processing speed of new transaction is increased, due to faster and less complicated confirmations; and onboarding of new nodes is faster and requires less bandwidth, as any blocks preceding the oldest unspent transaction are not required for any new confirmations. The result is a faster, lighter blockchain. In some cases, any blocks that precede the oldest unspent transaction may be archived, where copies of each block may not need to be stored by every node 106, and/or may be stored in a compressed format by the nodes 106.

In some cases, the nodes 106 may also be configured to perform aggregation of unspent transactions to create new "genesis" blocks. In traditional blockchains, a genesis block is the first block that is added to a blockchain where all cryptographic currency enters the blockchain and is distributed therefrom. Any new transaction confirmations can be traced back to the genesis block with every transfer in between occurring in intervening blocks. In the system 100, a node 106 may be configured to identify all unspent transaction outputs and create a new "genesis" block for the unspent transaction outputs. In some cases, the new genesis block may include direct copies of the transactions (e.g., the same inputs, addresses, amounts, etc.) where confirmation may not be necessary (due to duplicates that would fail confirmation due to those inputs being used in the original transaction). In such cases, the new genesis block may be added to the blockchain, and may include a flag or other indication of it being a new genesis block. In these cases, nodes 106 will know to ignore the duplicate nature of the transactions, and will also know that any transaction confirmation needs to only go back to the most recently added genesis block. The result is that, each time a new genesis block is created, any prior blocks can be archived and are not required for new transaction confirmations, thereby increasing processing and confirmation speeds. In these embodiments, new genesis blocks may be created at a periodic interval. When combined with aggregation by individual wallets, the number of unspent transactions included in any new genesis block may also be reduced, thereby greatly reducing the data size of the blockchain.

In some embodiments, a new genesis block may be stored in a separate blockchain. For instance, the blockchain network 104 may maintain a sidechain or a secondary blockchain for storage of all new genesis blocks. In such cases, the original blockchain may not have any issues or require any special configuration of nodes 106 to ignore the duplicate transactions that occur due to use of the new genesis block. In these embodiments, the new genesis block can be stored in the separate blockchain or sidechain, and be checked by a node 106 as part of the confirmation of new transactions. A node 106 may only need to go back through the original blockchain as far back as the time the most recent new genesis block has been created to confirm any new transaction. In cases where new genesis blocks are created periodically, the node 106 may use the period when going back through blocks and may check the original blockchain before checking the secondary blockchain or sidechain once any new blocks added in that period have been checked.

The methods and systems discussed herein increase the processing speeds of new blockchain transactions, decrease the bandwidth necessary for new blockchain transactions, and decrease the bandwidth necessary for onboarding of new nodes 106 in a blockchain network 104 through the specialized configuration of blockchain wallets in computing devices 102 to perform periodic aggregation of unspent transactions when trigger conditions occur. The result is a system 100 where the size and complication of blockchains can be maintained as time goes on, without the blockchain and associated processing speeds always increasing due to the periodic aggregations.

Computing Device

Figure 2:
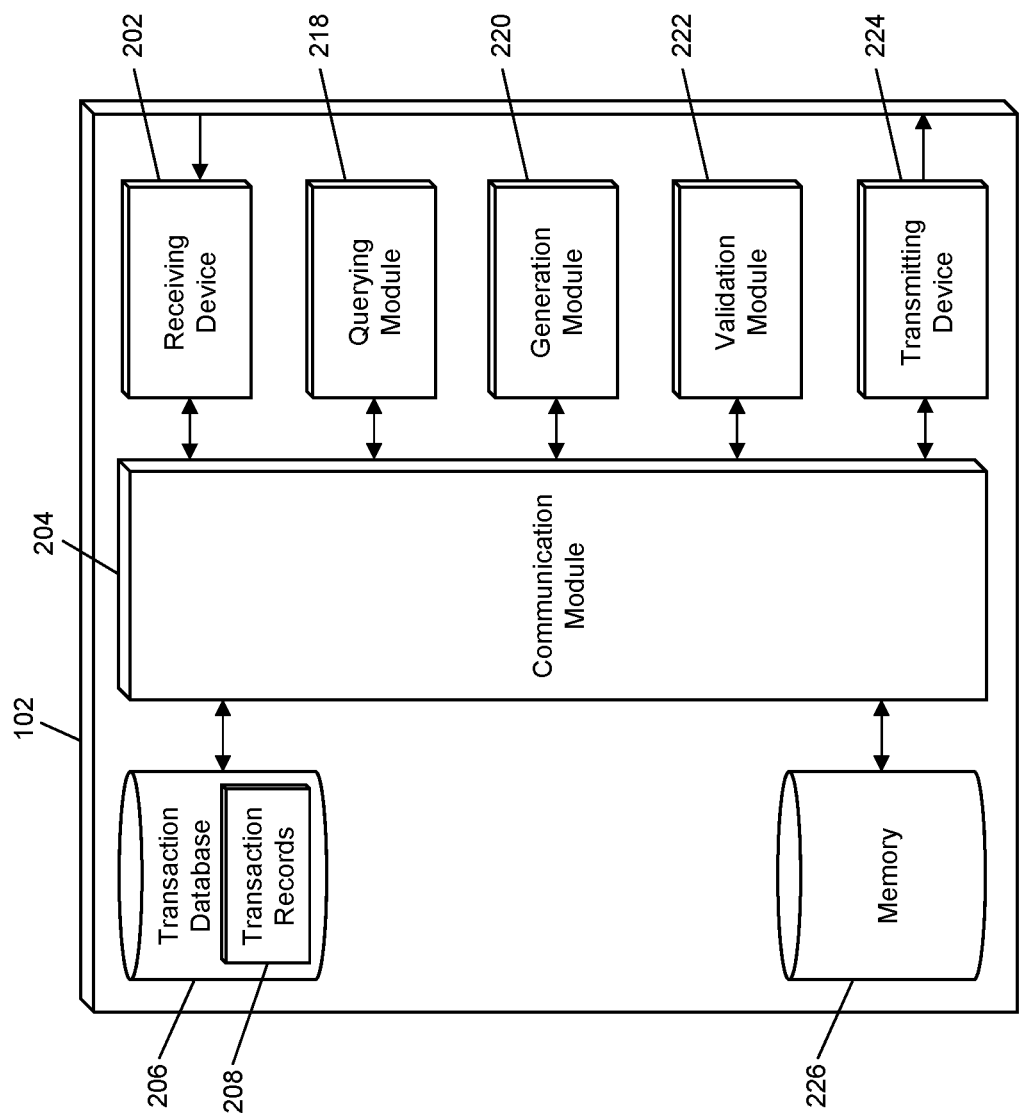
FIG. 2 is a block diagram illustrating the computing device of the system of FIG. 1 for aggregating blockchain transactions in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 500 illustrated in FIG. 5 and discussed in more detail below may be a suitable configuration of the computing device 102. In some cases, each node 106 in the blockchain network 104 may be configured similar to the computing device 102 in FIG. 2 or computer system 500 in FIG. 5, such as including the components illustrated therein.

The computing device 102 may include a receiving device 202. The receiving device 202 may be configured to receive data over one or more networks via one or more network protocols. In some instances, the receiving device 202 may be configured to receive data from nodes 106 and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by nodes 106 in a blockchain network 104, which may be superimposed or otherwise encoded with blockchain data values and/or confirmations of transactions involving the computing device 102, or may be superimposed or otherwise encoded with trigger conditions for periodic aggregation. A received trigger condition may be used to update trigger conditions stored in the computing device 102, or the received data may be a trigger itself for initiating aggregation by the computing device 102.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may include a transaction database 206. The transaction database 206 may be configured to store a plurality of transaction records 208 using a suitable data storage format and schema. The transaction database 206 may be a relational database that utilizes structured query language for the storage, identification, modifying, updating, accessing, etc. of structured data sets stored therein. Each transaction record 208 may be a record of a past transaction involving the blockchain wallet of the computing device 102, including unspent transactions. In some cases, transaction records 208 may only be stored for unspent transactions. Each unspent transaction may include an address, index value, or other data used by nodes 106 in new transactions that transfer the currency associated with the unspent transaction. Each unspent transaction may also include a currency amount that was transferred to the associated address as part of the initial transaction that is currently unspent by the blockchain wallet.

The computing device 102 may include a querying module 218. The querying module 218 may be configured to execute queries on databases to identify information. The querying module 218 may receive one or more data values or query strings, and may execute a query string based thereon on an indicated database, such as the transaction database 206 of the computing device 102 to identify information stored therein. The querying module 218 may then output the identified information to an appropriate engine or module of the computing device 102 as necessary. The querying module 218 may, for example, execute a query on the transaction database 206 to identify all unspent transactions for the blockchain wallet or to count the number of current unspent transactions for the blockchain wallet.

The computing device 102 may also include a generation module 220. The generation module 220 may be configured to generate data for use by the computing device 102 in performing the functions discussed herein. The generation module 220 may receive instructions as input, may generate data based on the instructions, and may output the generated data to one or more modules of the computing device 102. For example, the generation module 220 may be configured to generate digital signatures for new blockchain transactions using a private key of the blockchain wallet as well as recipient addresses for new blockchain transactions using a public key of the blockchain wallet. The generation module 220 may also be configured to generate aggregation transactions for the blockchain wallet, where an aggregation transaction includes each unspent transaction as input, the generated digital signature, a recipient address, and a currency amount that is the summation of the transfer amount of each of the unspent transactions.

The computing device 102 may also include a validation module 222. The validation module 222 may be configured to perform validations and verifications for the computing device 102 as part of the functions discussed herein. The validation module 222 may receive instructions as input, which may include data to be validated and/or data to be used in the validation. The validation module 222 may perform a validation or verification as requested, and may output a result of the validation to another module or engine of the computing device 102. The validation module 222 may, for example, be configured to validate digital signatures using public keys and validate aggregation transactions by confirming inputs as being unspent transactions.

The computing device 102 may also include a transmitting device 224. The transmitting device 224 may be configured to transmit data over one or more networks via one or more network protocols. In some instances, the transmitting device 224 may be configured to transmit data to nodes 106 and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to nodes 106 in the blockchain network 104 that are superimposed or otherwise encoded with new blockchain transactions, including aggregation transactions, which may include at least one or more unspent transactions, a digital signature, a recipient address, and a transfer amount.

The computing device 102 may also include a memory 226. The memory 226 may be configured to store data for use by the computing device 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, communication data for computing devices 102, signature generation and verification algorithms, address generation algorithms, trigger conditions, etc.

Process for Periodic Aggregation of Blockchain Transactions

Figure 3:
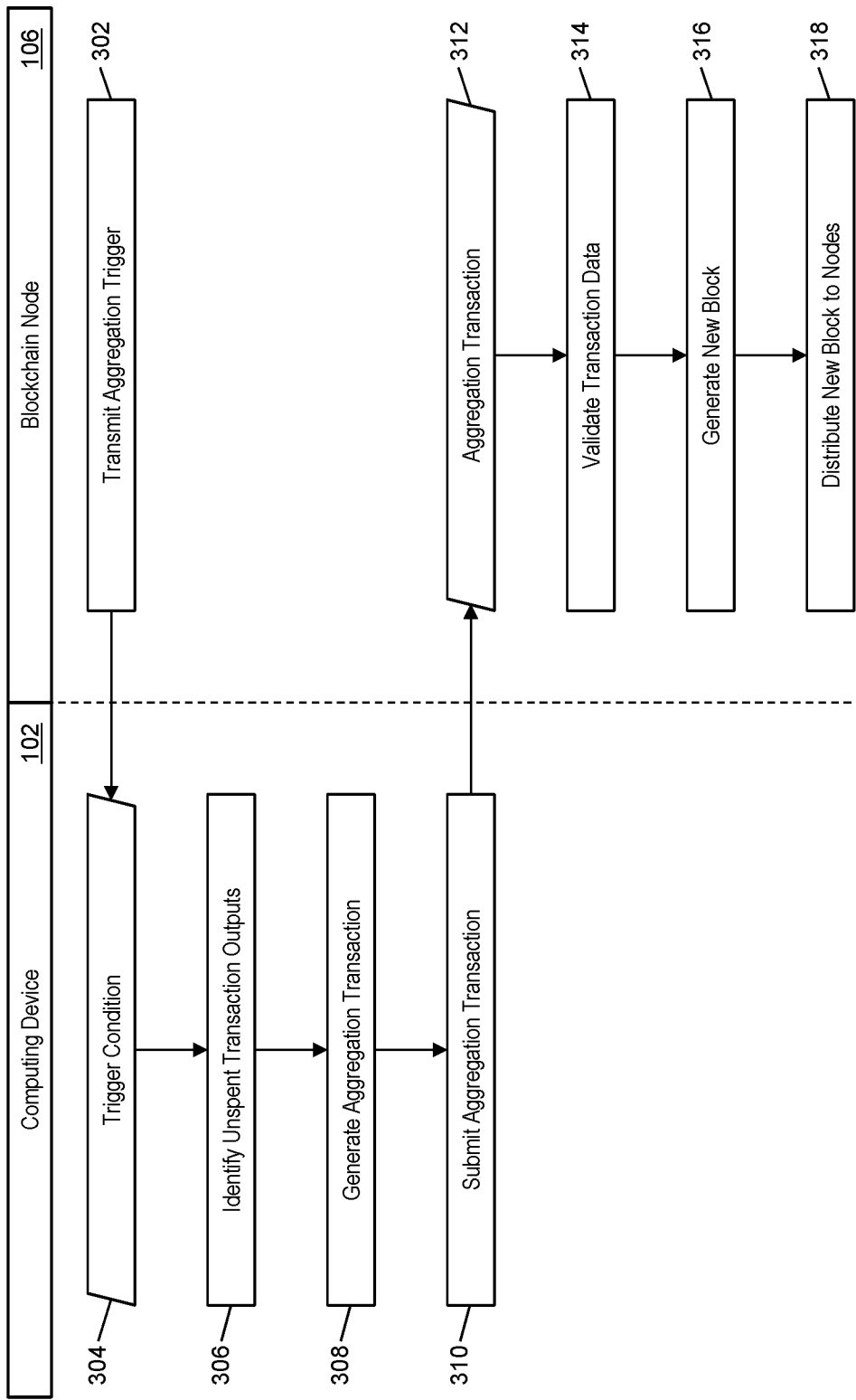
FIG. 3 is a flow diagram illustrating a process for aggregating blockchain transactions in the system of FIG. 1 in accordance with exemplary embodiments.

FIG. 3 illustrates an example process in the system 100 of FIG. 1 for the periodic aggregation of blockchain transactions by the computing device 102, to improve the processing times and bandwidth of future blockchain transactions for all blockchain wallets and nodes 106.

In step 302, the node 106 in the blockchain network 104 may transmit (e.g., via a transmitting device 224 thereof) a trigger to the computing device 102 to initiate aggregation of all unspent transactions for the computing device's blockchain wallet. In step 304, the receiving device 202 of the computing device 102 may receive the trigger from the node 106, which may be read by the computing device 102 as a trigger condition to initiate the aggregation process. In step 306, the querying module 218 of the computing device 102 may execute a query on the transaction database 206 thereof to identify all unspent transactions involving the computing device's blockchain wallet.

In step 308, the generation module 220 of the computing device 102 may generate an aggregation blockchain transaction. The aggregation blockchain transaction may include the identified unspent transactions and a transfer amount that is the summation of a transaction amount of each of the unspent transactions. The aggregation blockchain transaction may also include a digital signature, generated by the generation module 220 using the private key of the blockchain wallet, as well as a recipient address, generated by the generation module 220 using the public key of the blockchain wallet. In some cases, the public key may be included in the aggregation blockchain transaction.

In step 310, the transmitting device 224 of the computing device 102 may electronically transmit the aggregation blockchain transaction to the node 106 using a suitable communication network and method. In step 312, the node 106 may receive (e.g., via a receiving device 202 thereof) the aggregation blockchain transaction. In step 314, the node 106 may validate (e.g., via a validation module 222 thereof) the digital signature using the public key of the computing device's blockchain wallet as well as validate that each of the unspent transactions has not been spent, such as by checking each of the subsequent blocks in the blockchain for use of that unspent transaction output as an input of a future transaction. Upon successful validation, in step 316, the node 106 may generate (e.g., via a generation module 220 thereof) a new block that includes the aggregation blockchain transaction as one of the blockchain data values therein. In step 318, the new block may be transmitted by the node 106 (e.g., via a transmitting device 224 thereof) to a plurality of other nodes 106 in the blockchain network 104 for confirmation and then addition to the blockchain using traditional methods.

Exemplary Method for Periodic Aggregation of Blockchain Transactions

Figure 4:
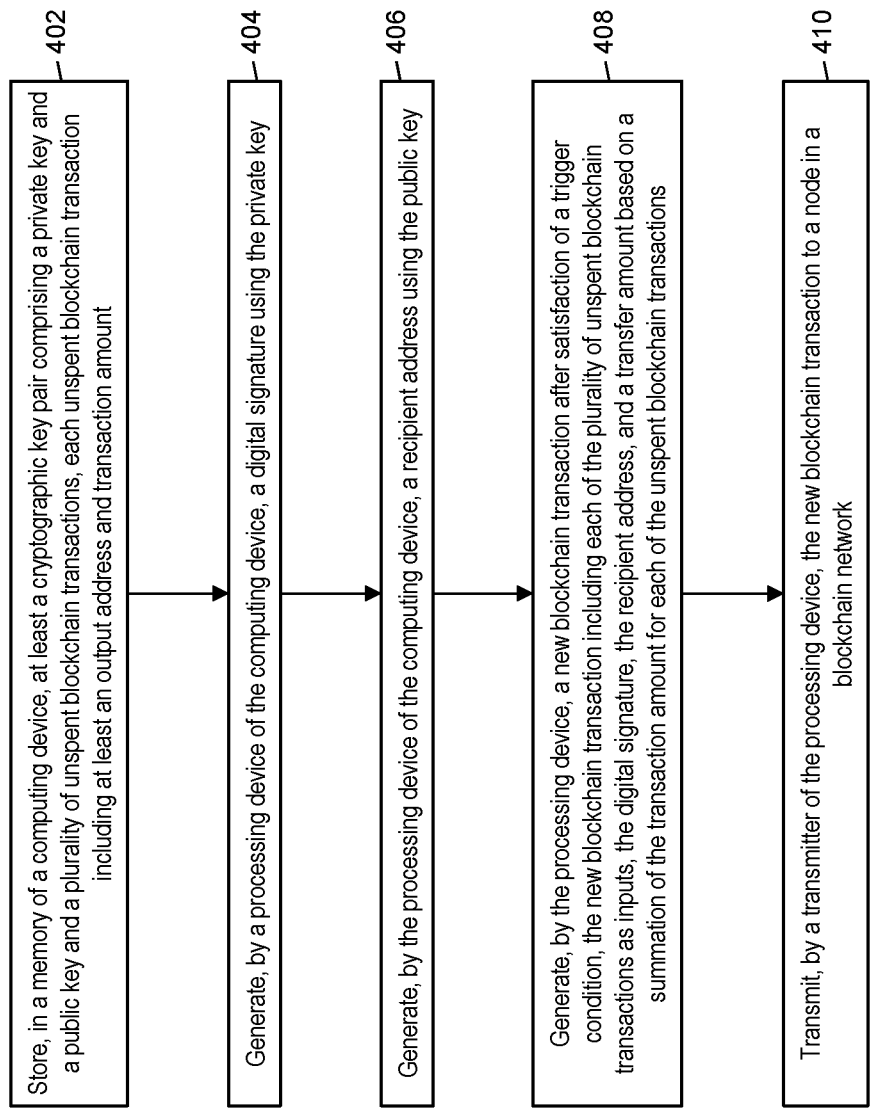
FIG. 4 is a flow chart illustrating an exemplary method for periodic aggregation of blockchain transactions for reduced processing times and bandwidths in accordance with exemplary embodiments.

FIG. 4 illustrates a method 400 for the periodic aggregation of blockchain transactions by a computing device upon satisfaction of a trigger condition that improves the processing speeds of blockchain transactions and reduces the processing times and bandwidths necessary thereof.

In step 402, at least a cryptographic key pair comprising a private key and a public key and a plurality of unspent blockchain transactions may be stored in a memory (e.g., transaction database 206, memory 226, etc.) of a computing device (e.g., the computing device 102), where each unspent blockchain transaction includes at least an output address and transaction amount. In step 404, a digital signature may be generated by a processing device (e.g., the generation module 220) of the computing device using the private key. In step 406, a recipient address may be generated by the processing device (e.g., the generation module 220) of the computing device using the public key.

In step 408, a new blockchain transaction may be generated by the processing device (e.g., the generation module 220) after satisfaction of a trigger condition, the new blockchain transaction including each of the plurality of unspent blockchain transactions as inputs, the digital signature, the recipient address, and a transfer amount based on a summation of the transaction amount for each of the unspent blockchain transactions. In step 410, the new blockchain transaction may be transmitted by a transmitter (e.g., the transmitting device 224) of the computing device to a node (e.g., node 106) in a blockchain network (e.g., the blockchain network 104).

In one embodiment, the plurality of unspent transactions may be a predetermined number. In some embodiments, the plurality of unspent transactions may include every unspent transaction associated with the cryptographic key pair.

In one embodiment, the method 400 may further include receiving, by a receiver (e.g., a receiving device 202) of the node in the blockchain network, the new blockchain transaction. In a further embodiment, the method 400 may also include verifying, by the node in the blockchain network, the digital signature using the public key of the cryptographic key pair. In another further embodiment, the method 400 may also include: identifying, by a processing device of the node in the blockchain network, each unspent transaction output associated with the cryptographic key pair in a blockchain associated with the blockchain network; and verifying, by the processing device of the node in the blockchain network, the plurality of unspent blockchain transactions included in the new blockchain transaction based on the identified unspent transaction outputs.

In another further embodiment, the method 400 may even further include: receiving, by the receiver of the node in the blockchain network, an additional new blockchain transaction from a plurality of different devices; and generating, by a processing device of the node in the blockchain network, a new block that includes a block header, the new blockchain transaction, and each additional new blockchain transaction. In an even further embodiment, the method 400 may also include transmitting, by a transmitter of the node in the blockchain network, the generated new block to a plurality of other nodes in the blockchain network for verification and updating of a blockchain associated with the blockchain network.

Computer System Architecture

Figure 5:
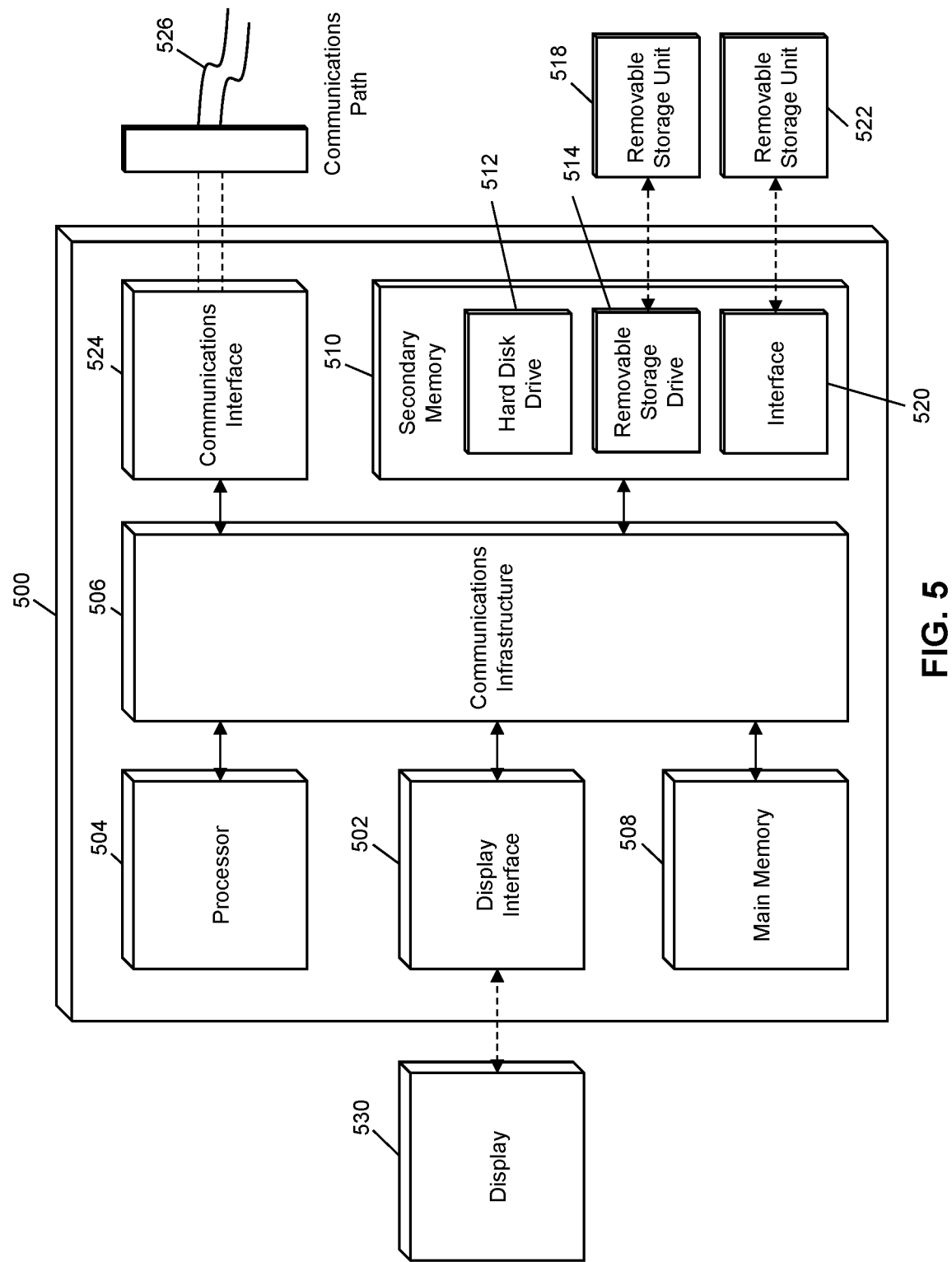
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 102 and node 106 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for periodic aggregation of blockchain transactions for reduced processing times and bandwidths. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for periodic aggregation of blockchain transactions for reduced processing times and bandwidths, comprising:
    storing, in a memory of a computing device, at least a cryptographic key pair comprising a private key and a public key and a plurality of unspent blockchain transactions for one or more blockchain wallets in a blockchain network, each unspent blockchain transaction including at least an output address and transaction amount;
    identifying, by a processing device of the computing device, at least two of the plurality of unspent blockchain transactions associated with the cryptographic key pair based on the output address of each of the plurality of unspent blockchain transactions;
    determining, by the processing device, a total amount of unspent cryptographic currency of the at least two unspent blockchain transactions associated with the cryptographic key pair;
    comparing, by the processing device, the total amount of unspent cryptographic currency to a trigger condition, the trigger condition being a predetermined total unspent cryptographic currency amount;
    determining, by the processing device, the trigger condition is satisfied, wherein the determining the trigger condition is satisfied includes:
        determining, by the processing device, the total amount of unspent cryptographic currency of the at least two unspent blockchain transactions associated with the cryptographic key pair meets or exceeds the trigger condition;
    generating, by the processing device of the computing device, a digital signature using the private key;
    generating, by the processing device of the computing device, a recipient address using the public key;
    generating, by the processing device, a new blockchain transaction, the new blockchain transaction including each of the identified plurality of unspent blockchain transactions associated with the cryptographic key pair as inputs, the digital signature, the recipient address, and a transfer amount based on a summation of the transaction amount for each of the unspent blockchain transactions, wherein the generating the new blockchain transaction includes:
        generating, by the processing device, a new genesis block in the blockchain, the new genesis block including copies of the at least two unspent blockchain transactions associated with the cryptographic key pair and a flag, the flag identifying the new genesis block; and
    transmitting, by a transmitter of the processing device, the new blockchain transaction to a node in a blockchain network.

2. The method of claim 1, wherein the trigger condition includes a predetermined number of unspent transactions associated with the cryptographic key pair, and wherein the determining the trigger condition is satisfied includes:
    determining, by the processing device, the total amount of unspent cryptographic currency of the at least two unspent blockchain transactions associated with the cryptographic key pair meets or exceeds the trigger condition and/or the total number of unspent transactions associated with the cryptographic key pair meets or exceeds the trigger condition.

3. The method of claim 1, wherein the plurality of unspent transactions includes every unspent transaction associated with the cryptographic key pair.

4. The method of claim 1, further comprising:
    receiving, by a receiver of the node in the blockchain network, the new blockchain transaction.

5. The method of claim 4, further comprising:
    receiving, by the receiver of the node in the blockchain network, an additional new blockchain transaction from a plurality of different devices; and
    generating, by a processing device of the node in the blockchain network, a new block that includes a block header, the new blockchain transaction, and each additional new blockchain transaction.

6. The method of claim 5, further comprising:
    transmitting, by a transmitter of the node in the blockchain network, the generated new block to a plurality of other nodes in the blockchain network for verification and updating of a blockchain associated with the blockchain network.

7. The method of claim 4, further comprising:
    verifying, by the node in the blockchain network, the digital signature using the public key of the cryptographic key pair.

8. The method of claim 4, further comprising:
    identifying, by a processing device of the node in the blockchain network, each unspent transaction output associated with the cryptographic key pair in a blockchain associated with the blockchain network; and
    verifying, by the processing device of the node in the blockchain network, the plurality of unspent blockchain transactions included in the new blockchain transaction based on the identified unspent transaction outputs.

9. A system for periodic aggregation of blockchain transactions for reduced processing times and bandwidths, comprising:
    a memory of a computing device configured to store at least a cryptographic key pair comprising a private key and a public key and a plurality of unspent blockchain transactions for one or more blockchain wallets in a blockchain network for one or more blockchain wallets in a blockchain network for one or more blockchain wallets in a blockchain network, each unspent blockchain transaction including at least an output address and transaction amount;

a processing device of the computing device configured to
identify at least two of the plurality of unspent blockchain transactions associated with the cryptographic key pair based on the output address of each of the plurality of unspent blockchain transactions;
determine a total amount of unspent cryptographic currency of the at least two unspent blockchain transactions associated with the cryptographic key pair;
compare the total amount of unspent cryptographic currency to a trigger condition, the trigger condition being a predetermined total unspent cryptographic currency amount;
determine the trigger condition is satisfied, wherein the determining the trigger condition is satisfied includes:
determining the total amount of unspent cryptographic currency of the at least two unspent blockchain transactions associated with the cryptographic key pair meets or exceeds the trigger condition;
generate a digital signature using the private key,
generate a recipient address using the public key, and
generate a new blockchain transaction, the new blockchain transaction including each of the identified plurality of unspent blockchain transactions cryptographic key pair as inputs, the digital signature, the recipient address, and a transfer amount based on a summation of the transaction amount for each of the unspent blockchain transactions, wherein the generating the new blockchain transaction includes:
the processing device further configured to generate a new genesis block in the blockchain, the new genesis block including copies of the at least two unspent blockchain transactions associated with the cryptographic key pair and a flag, the flag identifying the new genesis block; and
a transmitter of the processing device configured to transmit the new blockchain transaction to a node in a blockchain network.

10. The system of claim 9, wherein the trigger condition includes a predetermined number of unspent transactions associated with the cryptographic key pair, and wherein the determining the trigger condition is satisfied includes:
determining the total amount of unspent cryptographic currency of the at least two unspent blockchain transactions associated with the cryptographic key pair meets or exceeds the trigger condition and/or the total number of unspent transactions associated with the cryptographic key pair meets or exceeds the trigger condition.

11. The system of claim 9, wherein the plurality of unspent transactions includes every unspent transaction associated with the cryptographic key pair.

12. The system of claim 9, further comprising:
a receiver of the node in the blockchain network configured to receive the new blockchain transaction.

13. The system of claim 12, further comprising:
a processing device of the node in the blockchain network, wherein the receiver of the node in the blockchain network is further configured to receive an additional new blockchain transaction from a plurality of different devices, and the processing device of the node in the blockchain network is configured to generate a new block that includes a block header, the new blockchain transaction, and each additional new blockchain transaction.

14. The system of claim 13, further comprising:
a transmitter of the node in the blockchain network configured to transmit the generated new block to a plurality of other nodes in the blockchain network for verification and updating of a blockchain associated with the blockchain network.

15. The system of claim 12, wherein the node in the blockchain network is configured to verify the digital signature using the public key of the cryptographic key pair.

16. The system of claim 12, further comprising:
a processing device of the node in the blockchain network configured to
identify each unspent transaction output associated with the cryptographic key pair in a blockchain associated with the blockchain network, and
verify the plurality of unspent blockchain transactions included in the new blockchain transaction based on the identified unspent transaction outputs.

17. The method of claim 1, wherein the trigger condition includes a pre-determined time since a previous trigger condition associated with the cryptographic key pair, and wherein the determining the trigger condition is satisfied includes:
determining, by the processing device, the total amount of unspent cryptographic currency of the at least two unspent blockchain transactions associated with the cryptographic key pair meets or exceeds the trigger condition and/or the time since a previous trigger condition meets of exceeds the trigger condition.

18. The method of claim 1, wherein the trigger condition includes a specific day in a defined number of days, wherein the day in the defined number of days is determined based on dividing the total number of blockchain wallets in the blockchain network by the defined number of days, and wherein the determining the trigger condition is satisfied includes:
determining, by the processing device, the total amount of unspent cryptographic currency of the at least two unspent blockchain transactions associated with the cryptographic key pair meets or exceeds the trigger condition and/or the specific day meets the trigger condition.

19. The system of claim 9, wherein the trigger condition includes a pre-determined time since a previous trigger condition associated with the cryptographic key pair, and wherein the determining the trigger condition is satisfied includes:
determining, by the processing device, the total amount of unspent cryptographic currency of the at least two unspent blockchain transactions associated with the cryptographic key pair meets or exceeds the trigger condition and/or the time since a previous trigger condition meets of exceeds the trigger condition.

20. The system of claim 9, wherein the p trigger condition includes a specific day in a defined number of days, wherein the day in the defined number of days is determined based on dividing the total number of blockchain wallets in the blockchain network by the defined number of days, and wherein the determining the trigger condition is satisfied includes:

determining, by the processing device, the total amount of unspent cryptographic currency of the at least two unspent blockchain transactions associated with the cryptographic key pair meets or exceeds the trigger condition and/or the specific day meets the trigger condition.

\* \* \* \* \*